United States Patent
Lee et al.

(10) Patent No.: US 8,582,172 B2
(45) Date of Patent: Nov. 12, 2013

(54) IMAGE SCANNING APPARATUS AND METHOD TO CONTROL A LIGHT SOURCE THAT AN INTENSITY OF LIGHT IRRADIATED TO ANY ONE OF A PLURALITY OF LINES OF THE DOCUMENT FROM THE LIGHT SOURCE EQUAL TO AN INTENSITY OF LIGHT IRRADIATED TO ANOTHER LINE

(75) Inventors: Jae-kyu Lee, Seoul (KR); Kyung-rok Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 271 days.

(21) Appl. No.: 12/926,777

(22) Filed: Dec. 8, 2010

(65) Prior Publication Data
US 2011/0134446 A1    Jun. 9, 2011

(30) Foreign Application Priority Data
Dec. 9, 2009  (KR) .................. 10-2009-0121943

(51) Int. Cl.
*H04N 1/032* (2006.01)
*H04N 1/04* (2006.01)
(52) U.S. Cl.
USPC ............................. 358/1.6; 358/475

(58) Field of Classification Search
USPC ................................ 358/1.16, 475
See application file for complete search history.

(56) References Cited

U.S. PATENT DOCUMENTS

| 5,844,695 | A | 12/1998 | Suzuki |
| 6,386,452 | B1 | 5/2002 | Kawamura |
| 2005/0150956 | A1 | 7/2005 | Ikeda et al. |
| 2007/0165288 | A1 | 7/2007 | Ikeno et al. |
| 2010/0033773 | A1* | 2/2010 | Hoshi et al. ............ 358/475 |
| 2010/0231986 | A1* | 9/2010 | Roof .................... 358/474 |

OTHER PUBLICATIONS

Extended European Search Report dated Jan. 16, 2012 issued in corresponding European Patent Application No. 10192413.2.

* cited by examiner

*Primary Examiner* — Qian Yang
(74) *Attorney, Agent, or Firm* — Staas & Halsey LLP (57) ABSTRACT

The image scanning apparatus includes a light source including at least one light emitting diode (LED) to irradiate light to a document which is a scan target, a light source control unit to control a lighting-up point of time of the light source, an image sensor to transform an image formed by light reflected from the document into an electric signal according to a result of controlling the lighting-up point of time, and an output unit to output image data corresponding to the transformed electric signal.

19 Claims, 5 Drawing Sheets

IMAGE SCANNING APPARATUS AND METHOD TO CONTROL A LIGHT SOURCE THAT AN INTENSITY OF LIGHT IRRADIATED TO ANY ONE OF A PLURALITY OF LINES OF THE DOCUMENT FROM THE LIGHT SOURCE EQUAL TO AN INTENSITY OF LIGHT IRRADIATED TO ANOTHER LINE

CROSS-REFERENCE TO RELATED APPLICATIONS

This application claims the benefit of Korean Patent Application No. 10-2009-0121943, filed on Dec. 9, 2009, in the Korean Intellectual Property Office, the disclosure of which is incorporated herein in its entirety by reference.

BACKGROUND

1. Field

Apparatuses and methods consistent with the exemplary embodiments relate to an image scanning apparatus and method, and more particularly to an image scanning apparatus and method where intensities of light irradiated to a document from a light source are uniform across a plurality of lines of the document.

2. Description of the Related Art

An image scanning apparatus generally irradiates light onto document by using a light source and performs photoelectric transformation on reflected light of the irradiated light by using an image sensor, thereby generating image data. An example of the image sensor may be a charged-coupled device (CCD) sensor, and the light source may be a light emitting diode (LED) or an organic light emitting diode (OLED). To control the intensity of light irradiated from the light source, a pulse width modulating (PWM) scheme may be used.

SUMMARY

Accordingly, one or more exemplary embodiments provide an image scanning apparatus and method to improve the quality of a scanned image.

Also, one or more exemplary embodiments also provide a recording medium having recorded thereon a program for executing the image scanning method on a computer.

Additional aspects and/or advantages will be set forth in part in the description which follows and, in part, will be apparent from the description, or may be learned by practice of the invention.

According to an aspect, there is provided an image scanning apparatus including: a light source including at least one light emitting diode (LED) to irradiate light to a document which is a scan target; a light source control unit to control a lighting-up point of time of the light source in such a way that an intensity of light irradiated to any one of a plurality of lines of the document from the light source is equal to, or has a difference of less than a predetermined threshold value from, an intensity of light irradiated to another line of the plurality of lines; an image sensor to transform an image formed by light reflected from the document into an electric signal according to a result of controlling the lighting-up point of time; and an output unit to output image data corresponding to the transformed electric signal.

According to another aspect, there is provided an image forming apparatus including: an image scanning apparatus to control a lighting-up point of time of a light source in such a way that an intensity of light irradiated to any one of a plurality of lines of a document, which is a scan target, from the light source is equal to, or has a difference of less than a predetermined threshold value from, an intensity of light irradiated to another line of the plurality of lines, irradiate light to the document by using at least one light emitting diode (LED) included in the light source according to a result of controlling the lighting-up point of time, transform an image formed by a reflected light of the irradiated light from the document into an electric signal, and output image data corresponding to the transformed electric signal; and an image forming unit to print print data corresponding to the image data output from the image scanning apparatus onto a print sheet.

According to another aspect, there is provided an image scanning method including: controlling a lighting-up point of time of a light source in such a way that an intensity of light irradiated to any one of a plurality of lines of a document, which is a scan target, from the light source is equal to, or has a difference of less than a predetermined threshold value from, an intensity of light irradiated to another line of the plurality of lines; irradiating light to the document by using at least one light emitting diode (LED) included in the light source according to a result of controlling the lighting-up point of time; transforming an image formed by a reflected light of the irradiated light from the document into an electric signal; and outputting image data corresponding to the transformed electric signal.

According to another aspect, there is provided a computer-readable recording medium having recorded thereon a program for executing the image scanning method on a computer.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION

The present general inventive concept will now be described more fully with reference to the accompanying drawings, in which exemplary embodiments of the present general inventive concept are shown.

Figure 1:
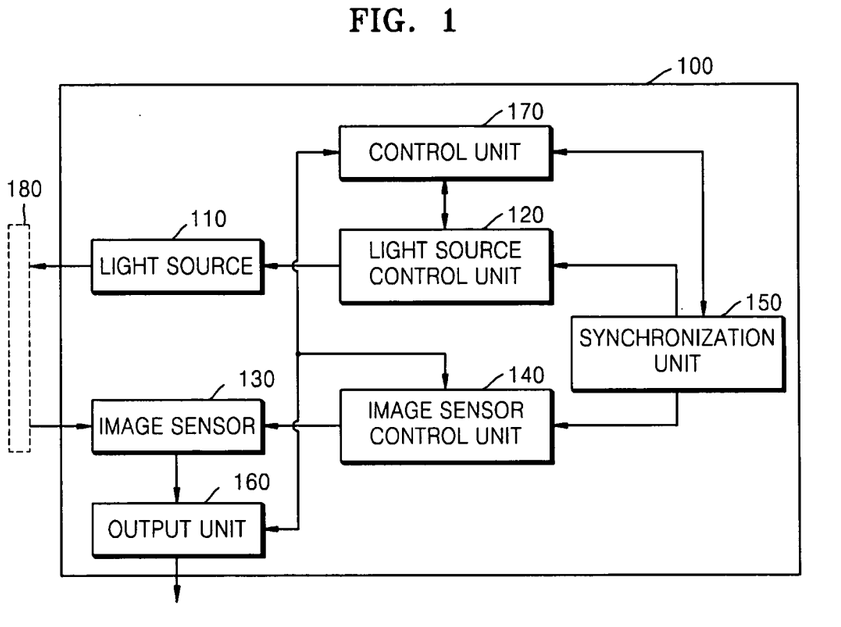
FIG. 1 is a block diagram of an image scanning apparatus according to an embodiment.

FIG. 1 is a block diagram of an image scanning apparatus 100 according to an embodiment. Referring to FIG. 1, the image scanning apparatus 100 includes a light source 110, a light source control unit 120, an image sensor 130, an image sensor control unit 140, a synchronization unit 150, an output unit 160, and a control unit 170.

The image scanning apparatus 100 shown in FIG. 1 includes components related to the current embodiment. Therefore, it can be easily understood by those of ordinary skill in the art that general-purpose components other than the components shown in FIG. 1 may be further included in the image scanning apparatus 100.

In the image scanning apparatus 100 shown in FIG. 1, the image sensor control unit 140 and the control unit 170 are optional components and thus may not be included in the image scanning apparatus 100 according to the current embodiment.

The image scanning apparatus 100 scans a scan target 180. The scanning involves converting document corresponding to the scan target 180, such as a photo, or a picture, into image data. The converted image data is output through the output unit 160 of the image scanning apparatus 100. In the following description, the converted image data will be referred to as scan data for the sake of convenience.

The scan data may be displayed on a user interface unit (not shown) provided in the image scanning apparatus 100, or may be displayed in the form of an image on a host device, a general-purpose computer system, or a Personal Digital Assistant (PDA) connected through the output unit 160. The scan data may be used in facsimile transmission, copying, e-mail transmission, or server transmission.

In the current embodiment, the output unit 160 may include a device which has a communication function and transmits data through a network. Therefore, in the current embodiment, the output unit 160 may include a modem used in facsimile transmission for transmitting data to an external device, a network module for connecting to a network, and a universal serial bus (USB) host module for forming a data transfer channel with a removable storage medium.

The image scanning apparatus 100 scans an image of the document which is the scan target 180, and outputs the scan data. To scan the image of the document, the light source 110 provided in the image scanning apparatus 100 irradiates light onto the document which is the scan target 180.

The light source 110 irradiates light onto document under the control of the light source control unit 120. The light source 110 includes at least one light emitting element. The light emitting element may be, but is not limited to, a light emitting diode (LED), an organic light emitting diode (OLED), a white light emitting diode (W-LED) or the like, and may be any light source element which irradiates light for scanning the scan target 180 and controls light intensity by using a current or voltage.

Although it will be described that the light source 110 includes at least one W-LED for the sake of convenience, the image scanning apparatus 100 according to the current embodiment is not limited thereto.

The light source control unit 120 controls a lighting-up point of time of the light source 110 in such a way that the intensity of light irradiated onto any one of a plurality of lines of document is equal to, or has a difference of less than a predetermined threshold value from, the intensity of light irradiated onto another line of the plurality of lines.

In the current embodiment, the light source control unit 120 may further include a switch for turning on/off a current or voltage applied to the light source 110 to control the lighting-up point of time of the light source 110, and an LED driver integrated circuit (IC) which drives the light source 110 by using a signal being output from the switch. In the current embodiment, a switch, an example of the light source control unit 120, may apply an output signal generated by a pulse generator to the light source 110 or apply an output signal amplified by a transistor to the light source 110.

The image sensor 130 transforms an image formed by reflected light from document, which originates from light irradiated from the light source 110 onto the document, into an electrical signal according to a result of a control operation performed by the light source control unit 120.

That is, the image sensor 130 receives reflected light from the document, photo-electrically transforms an image formed by the reflected light into an electric signal, and outputs a voltage which is proportional to the intensity of the reflected light. The image sensor 130 according to the current embodiment may be a charge-coupled device (CCD) sensor, or may further include a contact image sensor (CIS), without being limited to the CCD sensor.

The light source 110 according to the current embodiment irradiates light of the same intensity to each of the plurality of lines of the document under the control of the light source control unit 120, and the image sensor 130 receives reflected light originating from the irradiated light. If the intensities of light irradiated to the plurality of lines of the document are not uniform, the intensity of reflected light with respect to the same image of each line varies, causing a variation in a voltage which is output from the image sensor 130, thus leading to quality degradation such as generation of a horizontal image band in image data scanned by the image scanning apparatus 100.

Accordingly, under the control of the light source control unit 120, the intensity of light irradiated from the light source 110 to the document is uniform across the plurality of lines of the document or an intensity difference between lines is less than the predetermined threshold value or is very small, thereby improving the quality of image data scanned by the image scanning apparatus 100 according to the current embodiment.

Hereinafter, a detailed description will be given of embodiments which control the lighting-up point of time of the light source 110 in such a way that the intensity of light irradiated to any one of a plurality of lines of document is equal to, or has a difference of less than the predetermined threshold value from, the intensity of light irradiated to another line of the plurality of lines.

The image scanning apparatus 100 according to the current embodiment synchronizes the lighting-up point of time of the light source 110 with a first signal generated by the image sensor control unit 140 to make the intensity of light irradiated from the light source 110 to each of the plurality of lines of the document uniform across the plurality of lines of the document.

That is, the image sensor control unit 140 generates the first signal for controlling an exposure time or integration time during which the image sensor 130 receives reflected light, at predetermined intervals. The image sensor 130 has an exposure time (or integration time) at predetermined intervals to receive light reflected from the document under the control of the generated first signal. In the current embodiment, the predetermined interval may be a high frequency of several KHz or more. As will be understood by those of ordinary skill in the art, in the current embodiment, the first signal generated by the image sensor control unit 140 may correspond to a cycle of a shift pulse of the image sensor 130.

It may also be understood by those of ordinary skill in the art that in the current embodiment, the image sensor unit 140 may generate the first signal by using a pulse generator such as an oscillator.

The light source control unit 120 controls the lighting-up point of time of the light source 110 in such a way that the intensity of light irradiated to the document from the light source 110 during each period of the first signal generated by the image sensor control unit 140 is uniform. That is, the first signal generated by the image sensor control unit 140 has a single exposure time in a period of the first signal, and the single exposure time means a time period during which reflected light from the document is received to scan an image of a line of the document. In other words, in the current embodiment, a period of the first signal corresponds to a 1-line readout period.

In this way, the light source control unit 120 controls the lighting-up point of time of the light source 110 in such a way that the intensity of light irradiated from the light source 110 during each period of the first signal generated by the image sensor control unit 140 is uniform, thereby making the intensity of light irradiated to each line of the document from the light source 110 uniform across the plurality of lines of the document and thus improving the quality of image data scanned by the image scanning apparatus 100.

The synchronization unit 150 synchronizes the lighting-up point of time of the light source with a point of time at which the first signal is generated by the image sensor control unit 140. In this situation, the light source control unit 120 controls the light source 110 to be lit up and extinguished at least once during each period of the first signal. The number of lighting-up and extinguishing times of the light source 110 is uniform across periods of the first signal.

Therefore, the synchronization unit 150 synchronizes the first signal generated by the image sensor control unit 140 with the lighting-up point of time of the light source 110. In the current embodiment, the light source control unit 120 may use a pulse width modulation (PWM) scheme to control the intensity of light irradiated from the light source 110. It will be described below for the sake of convenience that the light source control unit 120 uses a PWM scheme to control the intensity of light irradiated from the light source 110, but the present general inventive concept is not limited thereto. The PWM scheme is obvious to those of ordinary skill in the art and thus will not be described in detail.

The synchronization unit 150 synchronizes the first signal for controlling an exposure time of the image sensor 130 with a PWM signal for controlling a lighting-up point of time of the light source 110, and the light source control unit 120 equalizes the number of lighting-up and extinguishing times of the light source 110 across a plurality of lines of document, thereby equalizing the intensity of light irradiated from the light source 110 across the plurality of lines of the document.

Figure 2:
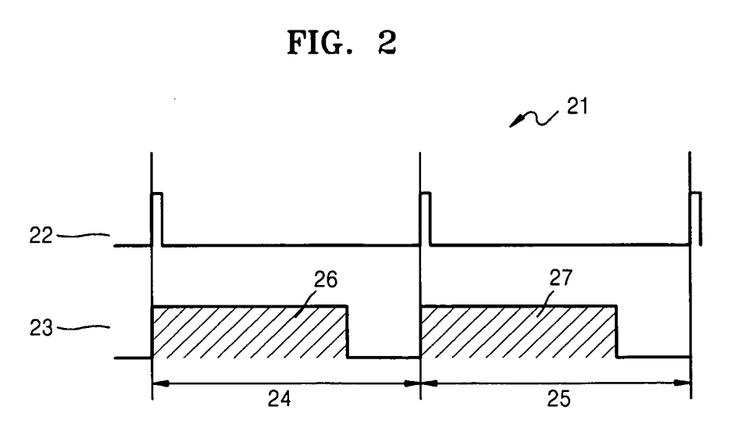
FIG. 2 is a timing diagram for synchronizing a first signal for controlling an image sensor with a lighting-up point of time of a light source, according to an embodiment.

FIG. 2 is a timing diagram 21 for synchronizing the first signal for controlling the image sensor 130 with the lighting-up point of time of the light source 110. Referring to FIG. 2, the timing diagram 21 shows a first signal 22 generated by the image sensor control unit 140 and a PWM signal 23 generated by the light source control unit 120.

The first signal 22 controls an exposure time of the image sensor 130, and the PWM signal 23 controls a lighting-up point of time of the light source 110. A period 24 of the first signal 22 corresponds to a 1 line readout period of document. That is, an inactive interval of the first signal 22 in the period 24 corresponds to the exposure time of the image sensor 130 according to the current embodiment, and the exposure time also means a time period during which the image sensor 130 receives light reflected from the document.

The PWM signal 23 controls the lighting-up point of time of the light source 110. In the current embodiment, the light source 110 may be lit up at a rising edge of the PWM signal 23 and may be extinguished at a falling edge of the PWM signal 23.

Thus, the synchronization unit 150 synchronizes the first signal 22 with a rising edge of the PWM signal 23, whereby a light emitting time of the light source 110 is uniform across periods of the first signal 22. That is, an intensity 26 of light irradiated from the light source 110 in the period 24 of the first signal 22 is equal to an intensity 27 of light irradiated from the light source 110 in another period 25 of the first signal 22.

In this way, as the synchronization unit 150 synchronizes a point of time when the first signal 22 is generated with a lighting-up point of time of the light source 110, the intensity of light irradiated to the document from the light source 110 is uniform across the plurality of lines of the document.

Referring back to FIG. 1, the image scanning apparatus 100 according to the current embodiment controls a period of a signal for controlling lighting-up and extinguishing points of time of the light source 110 to be a natural-number times a period of the first signal generated by the image sensor control unit 140, thereby making the intensity of light irradiated from the light source 110 uniform across the plurality of lines of the document.

In other words, the image sensor control unit 140 generates the first signal for controlling the image sensor 130 at intervals of a first time indicating a time required for scanning one of the plurality of lines of the document, and the light source control unit 120 generates a second signal for controlling lighting-up and extinguishing points of time of the light source 110 at intervals of a second time. The second time is N times the first time, in which N is a natural number. In the current embodiment, the light source control unit 120 adjusts a duty ratio of the PWM signal for controlling the lighting-up and extinguishing points of time of the light source 110, in such a way that a period of the second signal is the second time.

Figure 3:
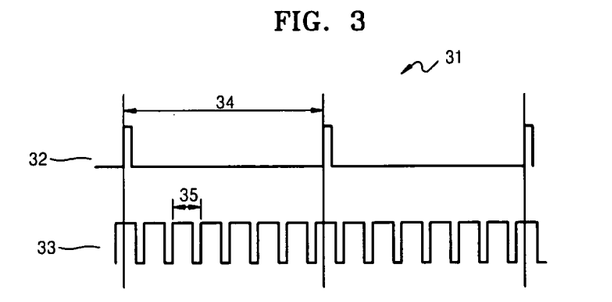
FIG. 3 is a timing diagram of a first signal for controlling an image sensor and a second signal for controlling lighting-up and extinguishing points of time of a light source, according to an embodiment.

FIG. 3 is a timing diagram 31 of a first signal 32 for controlling the image sensor 130 and a second signal 33 for controlling lighting-up and extinguishing points of time of the light source 110 according to the current embodiment. Referring to FIG. 3, the timing diagram 31 shows the first signal 32 generated by the image sensor control unit 140 and the second signal 33 generated by the light source control unit 120. In the current embodiment, the second signal 33 may be a PWM signal for controlling the lighting-up and extinguishing points of time of the light source 110.

The first signal 32 controls an exposure time of the image sensor 130, and the second signal 33 controls the lighting-up and extinguishing points of time of the light source 110. A period 34 of the first signal 32 is N times a period 35 of the second signal 33, in which N is a natural number, for example, N=1, 2, 3, etc.

Thus, a light emitting time of the light source 110 is uniform across periods of the first signal 32. In other words, the intensity of light irradiated from the light source 110 in the period 34 of the first signal 32 is equal to the intensity of light irradiated from the light source 110 in another period of the first signal 32.

As a period of the first signal 32 for controlling the image sensor 130, which is generated by the image sensor control unit 130, is a natural-number times a period of the second signal 33 for controlling lighting-up and extinguishing points of time of the light source 110, which is generated by the light source control unit 120, the intensity of light irradiated to the document from the light source 110 becomes uniform across a plurality of lines of the document. In the current embodiment, even when the first signal 32 and the second signal 33 are not synchronized with each other, the intensity of light irradiated from the light source 110 to the document becomes uniform across the plurality of lines of the document.

Referring back to FIG. 1, the image scanning apparatus 100 according to the current embodiment controls a period of the signal for controlling the lighting-up and extinguishing points of time of the light source 110 to be sufficiently larger than a period of the first signal generated by the image sensor control unit 140, in such a way that intensities of light irradiated to the plurality of lines of the document from the light source 110 are different by a value less than a predetermined threshold value. Consequently, intensities of light irradiated to the plurality of lines of the document become very similar to each other.

That is, the image sensor control unit 140 generates the first signal for controlling the image sensor 130 at intervals of a first time indicating a time required for scanning a line of the document, and the light source control unit 120 generates the second signal for controlling the lighting-up and extinguishing points of time of the light source 110 at intervals of a second time. The second time is sufficiently larger than the first time.

In the current embodiment, the second time may be regarded as being sufficiently larger than the first time when, but not limited to, the second time is at least 50 times the first time, or when the second time is significantly larger than the first time. When the second time is sufficiently larger than the first time, the second time is not limited to a natural-number times the first time. For example, the second time may be 50.3 times the first time.

More specifically, since the second time includes both a light emitting time of the light source 110 and a non-light emitting time of the light source 110, an interval between lighting-up points of time of the light source 110 for the lines of the document may be a maximum of $1/100$ times the second time if the second time is 50 times the first time. As a result, a difference between intensities of light irradiated to the lines of the document is less than 1%.

As a period of the first signal for controlling the image sensor 130, which is generated by the image sensor control unit 130, is sufficiently larger than a period of the second signal for controlling the lighting-up and extinguishing points of time of the light source 110, which is generated by the light source, control unit 120, intensities of light irradiated from the light source 110 to the lines of the document have a difference of less than a predetermined threshold value therebetween, which means that the intensities are very similar to each other. In the current embodiment, the predetermined threshold value may be 1%. That is, in the current embodiment, the intensities may be regarded as being very similar to each other when a difference between the intensities is less than 1%. In the current embodiment, even when the first signal and the second signal are not synchronized with each other, the intensity of light irradiated from the light source 110 to the document becomes uniform across the plurality of lines of the document.

It will be appreciated by those of ordinary skill in the art that if a difference between intensities of light irradiated to the lines of the document is less than 1%, a difference between images scanned from the lines is not perceivable to the naked eye. That is, if a difference between intensities of light irradiated to the lines of the document, each having the same image, is less than 1%, image data scanned from the document is very similar across the lines and thus an intensity difference of less than the predetermined threshold value between the lines of the document is not perceivable to the naked eye.

As can be appreciated from the foregoing description, the image scanning apparatus 100 controls intensities of light irradiated from the light source 110 to be uniform across lines of the document, or to be very similar to each other, thereby enhancing the quality of a scanned image.

The output unit 160 outputs image data corresponding to an electric signal transformed by the sensor array 130. The output image data may be formed as color image data by combining reflected light of light irradiated from the light source 110. The image data may be displayed on a user interface unit (not shown) provided in the image scanning apparatus 100, or may be transmitted to an external device connected to the image scanning apparatus 100 through the output unit 160.

The control unit 170 controls the overall function of the image scanning apparatus 100. The control unit 170 may include a processor or a plurality of processors. It may be appreciated that the processor may be implemented with an array of a plurality of logic gates or with a combination of a general-purpose microprocessor and a memory having stored therein a program that may be executed in the microprocessor.

As such, the image scanning apparatus 100 controls intensities of light irradiated to document from the light source 110 to be uniform across a plurality of lines of the document or to be very similar to each other, thus improving the quality of a scanned image. Moreover, the image scanning apparatus 100 enhances uniformity in a sub scan direction.

The light source 110 of the image scanning apparatus 100 according to the current embodiment may be of an array type or a light guide type. The array type has arranged therein at least one W-LED at predetermined intervals in a main scan direction in such a way that the array type diffuses light by using a light diffuser to irradiate the light to document. A detailed description will be made of a light guide type light source below.

Figure 4:
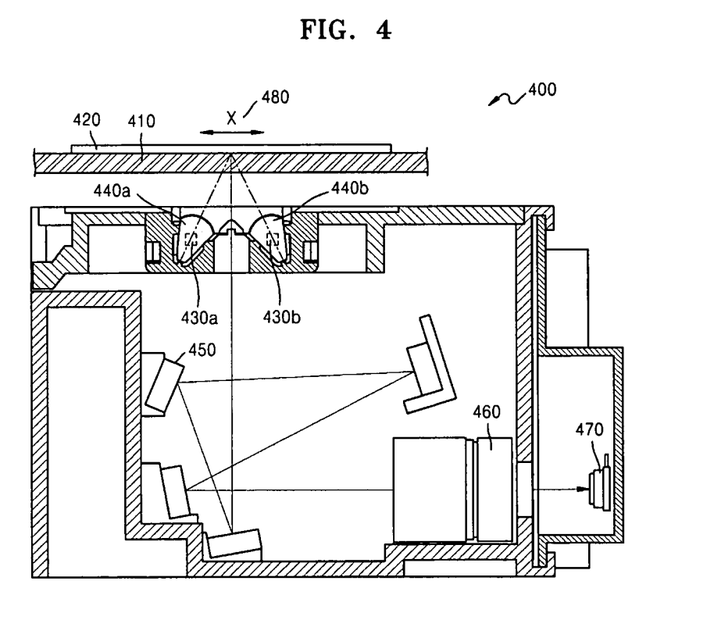
FIG. 4 illustrates an image scanning apparatus provided with light guides, according to an embodiment.

FIG. 4 illustrates an image scanning apparatus 400 provided with light guides, according to an embodiment. The image scanning apparatus 400 shown in FIG. 4 scans an image in a sub scan direction x 480. A first light source 430*a* and a second light source 430*b* irradiate light to a scan target 420, such as document, placed on a document support 410. Light reflected from the scan target 420 is guided to an image forming lens 460 by at least one reflective mirror 450, and the image forming lens 460 forms an image on an image sensor 470 with the light reflected from the scan target 420. The image sensor 470 then photoelectrically transforms light energy of the formed image into electric energy. The image scanning apparatus 400 according to the current embodiment may further include a first light guide 440*a* and a second light guide 440*b* which are disposed along a main scan direction as its length-wise direction to face the document support 410. The first light guide 440*a* and the second light guide 440*b* transform a point light source into a line light source to cause light to be reflected from document.

Figure 5:
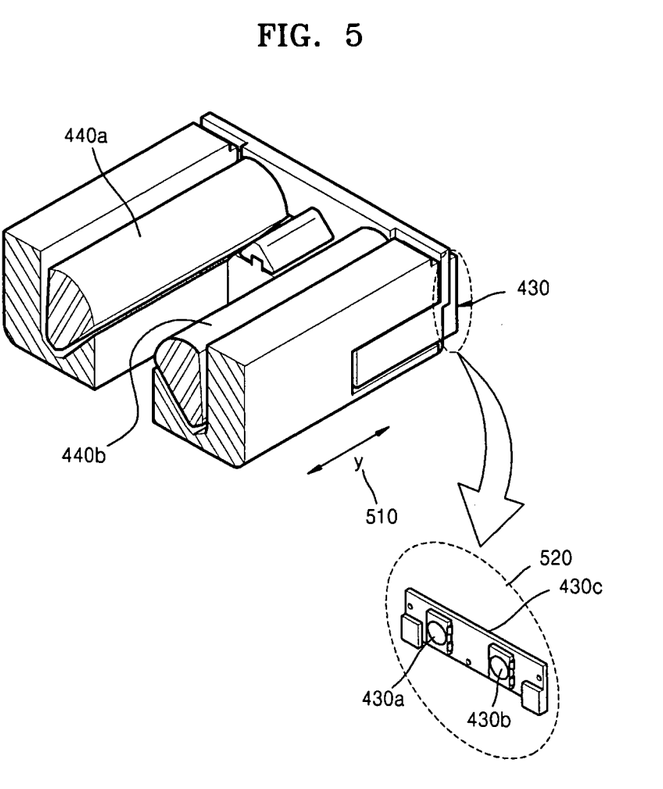
FIG. 5 is a partial cross-sectional view of a first light guide and a second light guide, according to an embodiment.

FIG. 5 is a partial cross-sectional view of the first light guide 440*a* and the second light guide 440*b* shown in FIG. 4, according to an embodiment. The first light guide 440*a* and the second light guide 440*b* may be formed of a rod-shape transparent material such as glass or plastic in a main scan direction y 510, that is, its length-wise direction.

In the current embodiment, a first light source 430*a* and a second light source 430*b* provided in a light source device 430 are installed at both end portions of the first light guide 440*a* and the second light guide 440*b*. Referring to a portion 520 which illustrates in detail the light source device 430, the light source device 430 includes the first light source 430*a*, the second light source 430*b*, and a substrate 430*c* which supplies power to the first light source 430*a* and the second light source 430*b*. That is, the light source device 430 may be provided at both end portions of each of the first light guide 440a and the second light guide 440b.

The first light guide 440a and the second light guide 440b changes a traveling path of light irradiated from the first light source 430a and the second light source 430b to irradiate the light to the scan target 420 placed on the document support 410. That is, the first light guide 440a and the second light guide 440b guide the light irradiated from the first light source 430a and the second light source 430b to an illuminating position. The first light source 430a and the second light source 430b may include a white light emitting diode (W-LED).

The intensity of light irradiated from the first light source 430a and the second light source 430b may be controlled by the light source control unit 120. In other words, the first light source 430a, the second light source 430b, and an image sensor 470 shown in FIG. 4 may correspond to the light source 110 and the image sensor 130 of the image scanning apparatus 100 shown in FIG. 1.

Accordingly, in the image scanning apparatus 400 provided with the first light guide 440a and the second light guide 440b as shown in FIGS. 4 and 5, sufficient light intensity can be secured for the scan target 420 through the first light guide 440a and the second light guide 440b, and a proper illumination distribution may be obtained in such a way that a formed image can provide a uniform output for each pixel. Due to the light source control unit 120 and the image sensor control unit 140 of the image scanning apparatus 400 provided with the first light guide 440a and the second light guide 440b, intensities of light irradiated from the first light source 430a and the second light source 430b become uniform across a plurality of lines of document or a difference between the intensities is less than a predetermined threshold value, thereby improving the quality of a scanned image.

In the image scanning apparatus 400 provided with the first light guide 440a and the second light guide 440b shown in FIGS. 4 and 5, four light sources, the first light source 430a and the second light source 430b, and two light guides, the first light guide 440a and the second light guide 440b, are included. However, it may be easily understood by those of ordinary skill in the art that the number of light sources 430a and 430b and the number of light guides 440a and 440b are not limited to the foregoing example.

Figure 6:
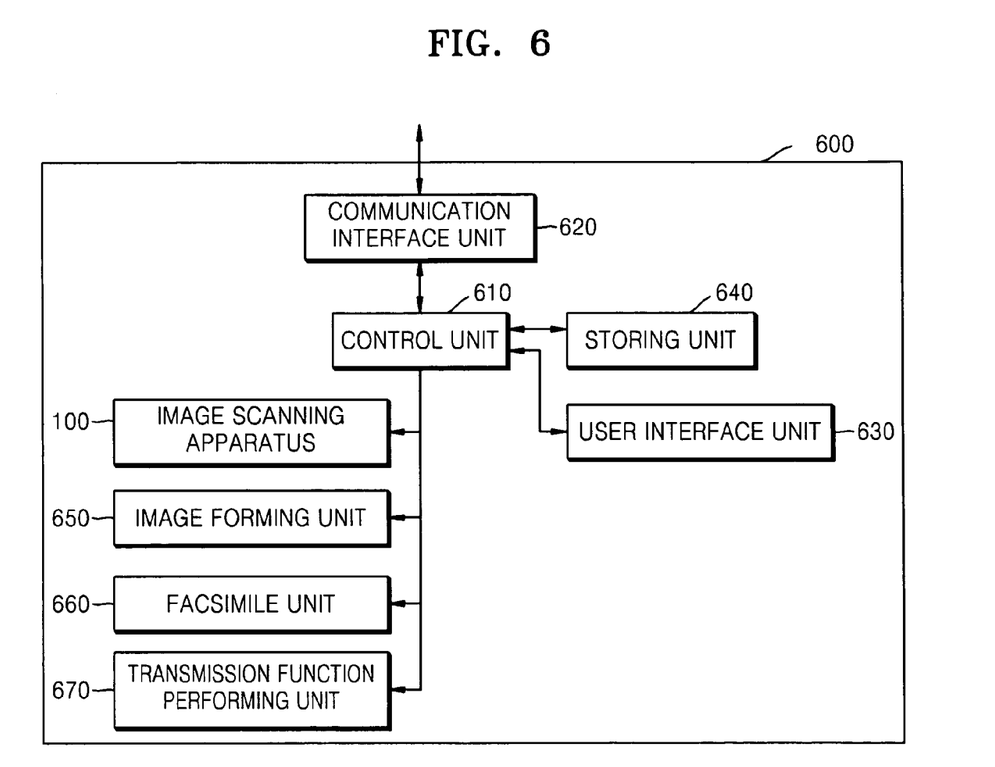
FIG. 6 is a block diagram of an image forming apparatus according to an embodiment.

FIG. 6 is a block diagram of an image forming apparatus 600 according to an embodiment. Referring to FIG. 6, the image forming apparatus 600 includes a control unit 610, a communication interface unit 620, a user interface unit 630, a storing unit 640, an image forming unit 650, a facsimile unit 660, a transmission function performing unit 670, and the image scanning apparatus 100.

The control unit 610 controls the overall operation of the image forming apparatus 600. The communication interface unit 620 transmits and receives data to/from an external device over a network. In the current embodiment, the communication interface unit 620 may include a module used in facsimile transmission/reception, a network module for connection to a network, and a universal serial bus (USB) host module for forming a data transfer channel with a removable storing medium, depending on functions of the image forming apparatus 600. The external device is connected with the image forming apparatus 600 over a wired or wireless network, and may be a facsimile, a computer system, a mobile phone, a personal digital assistant (PDA), or a server.

The user interface unit 630 obtains an input signal from a user and displays output information to the user. For example, the user interface unit 630 may include input/output devices provided in the image forming apparatus 600, such as a display panel, a mouse, a keyboard, a touch screen, a monitor, and a speaker.

The storing unit 640 stores data, print data, and scan data generated in operations performed by the image forming apparatus 600. The image forming unit 650 performs a print operation on document. The facsimile unit 660 facsimile-transmits the document. The transmission function performing unit 670 transmits the document to the external device such as a server, a removable recording medium, or a computer system.

The image scanning apparatus 100 generates image data of the document which is the scan target 180. The image data generated by the image scanning apparatus 100 may be stored in the storing unit 640 as scan data, may be displayed through the user interface unit 630, or may be transmitted to an external device through the communication interface unit 620. The image data generated by the image scanning apparatus 100 may be converted into print data by the image forming unit 650 to be printed on a print sheet, may be converted into facsimile data by the facsimile unit 660 to be facsimile-transmitted, or may be converted into transmission data by the transmission function performing unit 670 to be transmitted to an external device.

Therefore, by using high-quality image data scanned by the image scanning apparatus 100, the quality of print data on a print sheet may be improved or the quality of transmission data to be transmitted by facsimile transmission, or file transmission to a server may be enhanced.

The foregoing description in association with FIGS. 4 through 6 has been of components related to the current embodiment to avoid obscuring features of the current embodiment. However, it may be understood by those of ordinary skill in the art that general-purpose components other than components shown in FIGS. 4 through 6 may also be included.

Figure 7:
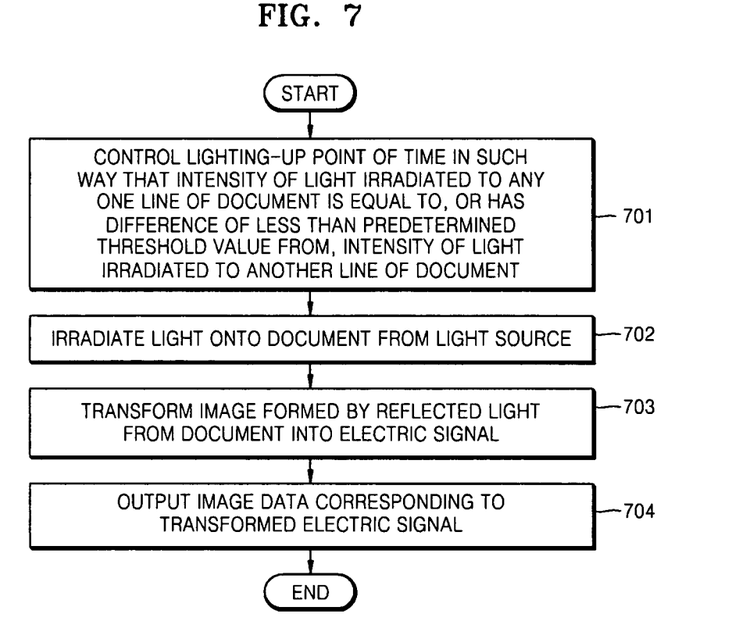
FIG. 7 is a flowchart illustrating an image scanning method according to an embodiment.

FIG. 7 is a flowchart illustrating an image scanning method according to an embodiment. Referring to FIG. 7, the image scanning method includes operations which are time-serially performed by the image scanning apparatus 100 shown in FIG. 1. Although omitted in the below description, the description made of the image scanning apparatus 100 shown in FIG. 1 may be applied to a method of controlling a light source of the image scanning apparatus 100.

In operation 701, to scan an image of any one of a purity of lines of document, the light source control unit 120 controls a lighting-up point of time of the light source 110 in such a way that an intensity of light irradiated to any one of a plurality of lines of document which is a scan target is equal to, or has a difference of less than a predetermined threshold value from, an intensity of light irradiated to another line of the plurality of lines.

In operation 702, the light source 110 irradiates light onto the document according to a result of a control operation performed by the light source control unit 120.

In operation 703, the image sensor 130 transforms an image formed by light reflected from the document, which originates from the light irradiated to the document from the light source 110, into an electric signal.

In operation 704, the output unit 160 outputs image data corresponding to the electric signal transformed by the image sensor 130.

Therefore, the image scanning apparatus 100 prevents generation of a horizontal image band in a scanned image, thereby enhancing the quality of a scanned image.

As is apparent from the foregoing description, according to the present general inventive concept, intensities of light irradiated to a document from a light source are uniform across a plurality of lines of the document or very similar to each other, thus preventing generation of a horizontal image band in a scanned image. Accordingly, deterioration in the quality of the scanned image can be prevented and the quality of the scanned image can be improved.

The exemplary embodiment can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. In addition, a data structure used in an embodiment may be recorded on a computer-readable recording medium by various means.

While the present general inventive concept has been particularly shown and described with reference to an exemplary embodiment thereof, it will be understood by those of ordinary skill in the art that various changes in form and details may be made therein without departing from the spirit and scope of the present general inventive concept as defined by the following claims. Accordingly, the disclosed embodiment should be considered in an illustrative sense not in a limiting sense. The scope of the present general inventive concept is defined not by the detailed description of the present general inventive concept but by the appended claims, and all differences within the scope will be construed as being included in the present general inventive concept.

What is claimed is:

1. An image scanning apparatus comprising:
    a light source comprising at least one light emitting diode (LED) to irradiate light to a document which is a scan target;
    a light source control unit to control a lighting-up point of time of the light source in such a way that an intensity of light irradiated to any one of a plurality of lines of the document from the light source is equal to, or has a difference of less than a predetermined threshold value from, an intensity of light irradiated to another line of the plurality of lines;
    an image sensor to transform an image formed by light reflected from the document into an electric signal according to a result of controlling the lighting-up point of time;
    an image sensor control unit arranged to generate a first signal with a first period, which is used to control an exposure time during which the image sensor receives the reflected light, the first period indicating a time required for scanning any one of the plurality of lines in the document; and
    an output unit to output image data corresponding to the transformed electric signal,
    wherein the plurality of lines are arranged in a sub scan direction and the light irradiated to each of the plurality of lines has a same color,
    wherein the light source control unit generates a second signal with a second period, which is used to control lighting-up and extinguishing points of time of the light source, and the first period is significantly larger than the second period in order that the difference is equal to or less than the predetermined threshold value even when the first signal and the second signal are not synchronized with each other.

2. The image scanning apparatus of claim 1,
    wherein the light source control unit controls the lighting-up point of time of the light source in such a way that an intensity of light irradiated from the light source to the document is uniform across periods of the generated first signal.

3. The image scanning apparatus of claim 2, further comprising a synchronization unit to synchronize a generation point of time of the first signal with the lighting-up point of time of the light source,
    wherein the light source control unit controls the light source to be lit up and extinguished at least once during each period of the generated first signal, and the number of lighting-up and extinguishing times is uniform across the periods of the first signal.

4. The image scanning apparatus of claim 1,
    wherein the first period is N times the second period and N is a natural number.

5. The image scanning apparatus of claim 1,
    wherein the first period is at least 50 times the second period and the predetermined threshold value being 1%.

6. The image scanning apparatus of claim 1, wherein the LED included in the light source comprises at least one white light emitting diode (W-LED).

7. The image scanning apparatus of claim 1, wherein the LED included in the light source comprises at least one organic light emitting diode (OLED).

8. The image scanning apparatus of claim 1, further comprising a light guide to guide a path of light irradiated from the light source to the document.

9. The image scanning apparatus of claim 8, wherein the light source is installed at both end portions of the light guide.

10. An image forming apparatus comprising:
    an image scanning apparatus to control a lighting-up point of time of a light source in such a way that an intensity of light irradiated to any one of a plurality of lines of document, which is a scan target, from the light source is equal to, or has a difference of less than a predetermined threshold value from, an intensity of light irradiated to another line of the plurality of lines, irradiating light to the document by using at least one light emitting diode (LED) included in the light source according to a result of controlling the lighting-up point of time, transform an image formed by a reflected light of the irradiated light from the document into an electric signal, and output image data corresponding to the transformed electric signal; and
    an image forming unit to print print data corresponding to the image data output from the image scanning apparatus onto a print sheet,
    wherein the plurality of lines are arranged in a sub scan direction and the light irradiated to each of the plurality of lines has a same color,
    wherein the image scanning apparatus generates a first signal with a first period and a second signal with a second period,
    the first signal is used to control lighting-up and extinguishing points of time of the light source and the second signal is used to control an exposure time during which an image sensor receives the reflected light, the first period indicates a time required for scanning any one of the plurality of lines in the document and is significantly larger than the second period in order that the difference is equals to or less than the predetermined threshold value even when the first signal and the second signal are not synchronized each other.

11. The image forming apparatus of claim 10, further comprising a facsimile unit to facsimile-transmit facsimile data corresponding to the image data which is output from the image scanning apparatus.

12. The image forming apparatus of claim 10, further comprising a transmission function performing unit to transmit transmission data corresponding to the image data output from the image scanning apparatus to an external device.

13. An image scanning method comprising:
controlling a lighting-up point of time of a light source in such a way that an intensity of light irradiated to any one of a plurality of lines of document, which is a scan target, from the light source is equal to, or has a difference of less than a predetermined threshold value from, an intensity of light irradiated to another line of the plurality of lines;
irradiating light to the document by using at least one light emitting diode (LED) included in the light source according to a result of controlling the lighting-up point of time;
transforming an image formed by a reflected light of the irradiated light from the document into an electric signal; and
outputting image data corresponding to the transformed electric signal,
wherein the plurality of lines are arranged in a sub scan direction and the light irradiated to each of the plurality of lines has a same color,
wherein the controlling the lighting-up point of time of the light source comprises generating a first signal with a first period and a second signal with a second period,
the first signal is used to control lighting-up and extinguishing points of time of the light source and the second signal is used to control an exposure time during which an image sensor receives the reflected light,
the first period indicates a time required for scanning any one of the plurality of lines in the document and is significantly larger than the second period in order that the difference is equals to or less than the predetermined threshold value even when the first signal and the second signal are not synchronized each other.

14. The image scanning method of claim 13,
wherein the controlling of the lighting-up point of time of the light source comprises controlling the lighting-up point of time of the light source in such a way that an intensity of light irradiated from the light source to the document is uniform across periods of the generated first signal.

15. The image scanning method of claim 14, further comprising synchronizing a generation point of time of the first signal with the lighting-up point of time of the light source,
wherein the controlling of the lighting-up point of time of the light source comprises controlling the light source to be lit up and extinguished at least once during each period of the generated first signal, and the number of lighting-up and extinguishing times is uniform across the periods of the first signal.

16. The image scanning method of claim 13,
wherein the first period is N times the second period and N is a natural number.

17. The image scanning method of claim 13, wherein the first period indicates a time required for scanning any one of the plurality of lines of the document.

18. The image scanning method of claim 13, wherein the first period is at least 50 times the second period, and the predetermined threshold value is 1%.

19. A non-transitory computer-readable recording medium having recorded thereon a program for executing the image scanning method of claim 13 on a computer.

* * * * *